United States Patent
Liu et al.

(10) Patent No.: US 7,061,749 B2
(45) Date of Patent: Jun. 13, 2006

(54) SUPERCAPACITOR HAVING ELECTRODE MATERIAL COMPRISING SINGLE-WALL CARBON NANOTUBES AND PROCESS FOR MAKING THE SAME

(75) Inventors: Tao Liu, Marietta, GA (US); Satish Kumar, Lawrenceville, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 81 days.

(21) Appl. No.: 10/609,725

(22) Filed: Jun. 30, 2003

(65) Prior Publication Data

US 2006/0098389 A1   May 11, 2006

Related U.S. Application Data

(60) Provisional application No. 60/393,270, filed on Jul. 1, 2002.

(51) Int. Cl.
  *H01G 9/00*  (2006.01)
(52) U.S. Cl. .............. 361/502; 361/503; 361/523
(58) Field of Classification Search ........ 361/502–507, 361/511, 523, 525–526, 528–530; 423/445 R
See application file for complete search history.

(56) References Cited

U.S. PATENT DOCUMENTS

| | | | |
|---|---|---|---|
| 3,652,902 A * | 3/1972 | Hart et al. ................ 361/502 |
| 5,597,661 A * | 1/1997 | Takeuchi et al. ........... 429/314 |
| 5,682,288 A * | 10/1997 | Wani ........................ 361/502 |
| 6,031,711 A | 2/2000 | Tennent et al. ............. 361/303 |
| 6,099,960 A | 8/2000 | Tennent et al. ............. 428/367 |
| 6,205,016 B1 | 3/2001 | Niu ............................ 361/503 |
| 6,414,836 B1 | 7/2002 | Tennent et al. ............. 361/313 |
| 6,432,866 B1 | 8/2002 | Tennent et al. ............. 502/180 |
| 2003/0043533 A1* | 3/2003 | Lewis et al. ................ 361/502 |

* cited by examiner

*Primary Examiner*—Eric W. Thomas
(74) *Attorney, Agent, or Firm*—Williams, Morgan & Amerson, P.C.

(57) ABSTRACT

The present invention relates to a supercapacitor, also known as an electrical double-layer capacitor or ultracapacitor, having electrode material comprising single-wall carbon nanotubes. The carbon nanotubes can be derivatized with functional groups. The electrode material is made by preparing a polymer-nanotube suspension comprising polymer and nanotubes, forming the polymer-nanotube suspension into a polymer-nanotube composite of the desired form, carbonizing the polymer-nanotube composite to form a carbonaceous polymer-nanotube material, and activating the material. The supercapacitor includes electrode material comprising activated carbonaceous polymer-nanotube material in contact with current collectors and permeated with an electrolyte, which may be either fluid or solid. In the case of a fluid or compressible electrolyte, an electrolyte-permeable separator or spacer is interposed between the electrodes to keep the electrodes from shorting. The supercapacitor made with electrodes comprising underivatized single-wall carbon nanotubes and polymer that has been carbonized and activated appears to operate as a non-Faradaic supercapacitor.

38 Claims, 7 Drawing Sheets

SUPERCAPACITOR HAVING ELECTRODE MATERIAL COMPRISING SINGLE-WALL CARBON NANOTUBES AND PROCESS FOR MAKING THE SAME

CROSS-REFERENCE TO RELATED APPLICATION

This application claims priority from U.S. provisional application Ser. No. 60/393,270, filed Jul. 1, 2002, which application is incorporated herein by reference.

This invention was made with United States Government support under Grant No. F49620-00-1-0147 awarded by the Air Force Office of Scientific Research and under Grant No. N00014-01-1-0657 awarded by the Office of Naval Research. Government may have certain rights in the invention.

FIELD OF THE INVENTION

This invention relates generally to an energy storage device, more particularly to a capacitor, and even more particularly to a supercapacitor utilizing an electrode material comprising single-wall carbon nanotubes.

BACKGROUND OF THE INVENTION

Supercapacitors, like batteries and conventional capacitors, are types of energy storage devices. The performance characteristics of an energy storage device (ESD) can be evaluated in terms of its energy density, the amount of energy that can be stored per unit weight or volume, and in terms of its power density, the rate at which an amount of energy can be transferred in or out of that unit weight or volume. Energy storage devices are commonly used as independent power sources or supplemental power sources for a broad spectrum of portable electronic equipment and electric vehicles.

Batteries are common energy storage devices for providing portable power. Energy storage in batteries is generally Faradaic, meaning that a chemical or oxidation state change occurs in the electroactive material. Although batteries have the potential for high energy density and can provide power over a wide range of voltages, their power density and the number of charging cycles are on-going limitations.

Capacitors are also common energy storage devices. Energy storage in conventional capacitors is generally non-Faradaic, meaning that no electron transfer takes place across an electrode interface, and the storage of electric charge and energy is electrostatic. Although capacitors have much higher energy transfer rates than batteries and can withstand orders of magnitude more charging cycles, they are limited by their low energy storage capacity, which is commonly on the order of microfarads or picofarads.

Supercapacitors, also known as ultracapacitors, electrochemical capacitors or electrical double-layer capacitors, are energy storage devices which combine the high energy storage potential of batteries with the high energy transfer rate and high recharging capabilities of capacitors. Supercapacitors can have hundreds of times more energy density than conventional capacitors and thousands of times higher power density than batteries.

Due to their high capacitance and high power, supercapacitors can be effective energy storage devices for a wide variety of applications. In low-voltage configurations of 5.5 volts or less, supercapacitors have applications in consumer electronics, such as backup power supplies for memories, microcomputers and clocks. In higher voltage configurations, supercapacitors have opportunities in electrical power load leveling, battery augmentation and pulse discharge applications, such as in wireless communication products. Other battery augmentation applications are possible in electric and fuel cell vehicles in which supercapacitors could be used to boost acceleration and regulate braking energy. Since supercapacitors can be recharged many times faster than rechargeable batteries and through many thousands of cycles, supercapacitors have applications in rechargers for such products as power tools, cordless phones, flashlights, electric shavers and other rechargeable devices. Supercapacitors are also expected to be useful in a wide range of robotic applications.

Energy storage in supercapacitors can be either Faradaic or non-Faradaic. Examples of supercapacitors that are of the Faradaic type include redox supercapacitors based on mixed metal oxides, such as ruthenium dioxide and other transition metal oxides. Redox supercapacitors can have both high energy density and power density. For example, an energy density of 8.3 Wh/kg and a power density of 30 kW/kg were achieved in a prototype 25-V capacitor built using $RuO_2 \cdot xH_2O$ as the electrode material. (see B. E. Conway, *Electrochemical Supercapacitors: Scientific Fundamentals and Technological Applications*, Kluwer Academic/Plenum Publishers, NY, 1999, p. 266). However, due to the high cost, scarcity and toxicity of suitable metal oxides, supercapacitors based on carbon electrode materials may be preferred in many applications, especially those for power-related systems requiring higher capacitance capabilities.

In non-Faradaic supercapacitors, also known as electrical double-layer capacitors (EDLC), no electron transfer takes place across the electrode interface, and the storage of the electric charge and energy is electrostatic. In these supercapacitors, positive and negative charges accumulate electrostatically on the electrodes at the electrode-electrolyte interface. Electrical energy is stored in the electric double layer from charge separation, i.e. the electrostatic force between an ionically conducting electrolyte and a conducting electrode. The ions displaced in forming the double layers are transferred between electrodes by diffusion through the electrolyte.

In both the Faradaic and non-Faradaic supercapacitor systems, capacitance is highly dependent on the characteristics of the electrode material. Ideally, the electrode material should be electrically conducting and have a porous structure. The characteristics of the porous structure, including pore size, pore size distribution and pore volume fraction, can enable the formation of a large amount of surface area that can be used either for the development of the electrical double layer for static charge storage to provide non-Faradaic capacitance or for the reversible chemical redox reaction sites to provide Faradaic capacitance. Active electrode materials for supercapacitors include such materials as metal oxides, conducting polymers and various forms of carbon.

Electrochemical double-layer capacitors having electrode material based on high surface-area carbon, such as activated carbon powders and fibers, have shown promise. As electrode materials, carbon powders are generally more cost effective, but fibers and fabrics generally can produce higher performance supercapacitors.

The desirable attributes of the carbon electrode material include such factors as high surface area for the accumulation of charge at the electrode/electrolyte interface, good intra- and interparticle conductivity in the porous matrices, good electrolyte accessibility to the intrapore surface area, chemical stability and high electrical conductivity. The properties and performance of various carbonaceous materials as supercapacitor electrodes can vary widely depending on the carbon source, purity and treating conditions. For example, some possible carbonaceous materials suitable for electrode material include such materials as activated carbon, carbon black, carbon fiber cloth, highly oriented pyrolytic graphite, graphite powder, graphite cloth, glassy carbon and carbon aerogel.

One of the problems encountered with the use of different forms of activated carbon in electrodes is the lack of self-adhesion. To prepare an electrode with activated carbon, a polymeric binder is commonly incorporated in the electrode material. The use of insulating polymeric binders aggravates the power performance of the resulting supercapacitor by increasing the resistance of the electrode. In addition, the use of binder materials can fill or block the pores of the activated carbonaceous material and thereby reducing the available surface area available for double layer formation.

Generally, supercapacitors have energy densities in the range of about 1 to about 10 Wh/kg, which is about one-tenth of that of secondary cell batteries, which have energy densities of about 20 to about 100 Wh/kg. In contrast, supercapacitors generally have power densities in the range of about 1000 to about 2000 W/kg, which is about ten times higher than those of secondary cell batteries, which have power densities in the range of about 50 to about 200 W/kg.

Although the power density of supercapacitors is about ten times that of the secondary batteries, the energy density is smaller than that of secondary cells, and a serious deficiency for practical applications. Thus, there is a need for supercapacitors with high energy densities as well as high power densities.

SUMMARY OF THE INVENTION

The present invention, in one embodiment, relates to a capacitor device, and more particularly to a supercapacitor having an electrode material prepared from single-wall carbon nanotubes and polymer, and method for making the same. In one embodiment, a supercapacitor comprises at least two electrodes, at least two current collectors, and an electrolyte in contact with and interposed between the electrodes. The electrodes comprise an activated carbonaceous polymer-nanotube material comprising single-wall carbon nanotubes and polymer, wherein the polymer-nanotube material was pyrolyzed and activated. The current collectors comprise a conducting material and are each in contact with an electrode.

The supercapacitor of the present invention includes electrodes comprising single-wall carbon nanotubes and polymer that has been carbonized, wherein the electrodes are in contact with an electrolyte between the electrodes, wherein the electrodes are in contact with and interposed between two conducting current collectors. If the electrolyte is a fluid or compressible medium, a non-conducting separator, permeable to the electrolyte ions, is interposed between the electrodes to prevent shorting.

The arrangement of the basic elements of the supercapacitor, in one embodiment, includes an electrolyte in contact with and able to permeate into two opposing porous electrodes, which are, in turn, in contact with and between two metallic current collectors. In the case of a fluid or compressible electrolyte, a separator or spacer, permeable by the ions of the electrolyte, can be interposed between the electrodes to prevent shorting.

In one embodiment, a method for making an electrode comprises forming a polymer-nanotube composite from a polymer-nanotube suspension comprising single-wall carbon nanotubes and polymer, heat treating the polymer-nanotube composite in a non-oxidizing environment to form a carbonaceous polymer-nanotube material, and activating the carbonaceous polymer-nanotube material. The electrode material is prepared from a composite comprising single-wall carbon nanotubes and a polymer capable of being carbonized and activated. The form of the electrode material is typically a film, however, similar forms, such as thin mats, fibers, cloths, non-woven fabrics, felts, and the like, are also suitable forms. Although not meaning to be limiting, the film form will be used for clarity, although it is meant and understood that other forms could also be used in a similar capacity. The single-wall carbon nanotubes can be used as synthesized or after purification. The polymer is a polymer, copolymer or mixture thereof capable of being carbonized and activated such that the resulting material is primarily carbon with high surface area.

In another embodiment, the electrode material is prepared by mixing polymer and single-wall carbon nanotubes to make a polymer-nanotube suspension. In one embodiment, the polymer can be solubilized or suspended in a solvent. The solvent can be mixed with the polymer prior to, at the same time as, or after the nanotubes are combined with the polymer. If a solvent is used, the amount of solvent in the polymer-nanotube suspension can be adjusted either by adding or removing solvent to achieve the desired viscosity for processing. The polymer-nanotube suspension can be processed into a polymer-nanotube composite by various means, such as by forming into a film, fiber or other shape suitable for the desired end use. A polymer-carbon nanotube composite film can be made with the polymer-carbon nanotube suspension by coating, casting or any other means of film preparation. If solvent is used in the polymer-nanotube suspension, the remaining solvent is removed from the composite. After shaping, and removal of any residual solvent, if used in the suspension, the polymer-nanotube composite can, optionally, be heated in an oxidative environment to stabilize the polymer. Typically, the stabilization is done in a temperature range of about 200° C. and 300° C.

The polymer-nanotube composite is then heat treated, or pyrolyzed, at a sufficient temperature and for a sufficient length of time to at least partially carbonize the polymer. The polymer-nanotube composite is then activated by any suitable means. For example, activation can be achieved in a carbon dioxide environment at sufficient temperature and time duration to activate the carbonized polymer and result in an activated carbonaceous polymer-nanotube composite. The resulting activated carbonaceous polymer-nanotube composite is useful as electrode material in supercapacitors.

In another embodiment, a supercapacitor is constructed by preparing at least two electrodes, wherein each electrode is in contact with a current collector and interposing an electrolyte between the electrodes. The electrolyte can be fluid or solid, aqueous or organic. If the electrolyte is a fluid or compressible medium, a permeable membrane or spacer is positioned between the electrodes to prevent shorting between the electrodes.

The supercapacitor can be of various designs including, but not limited, to stacked and spiral-wound configurations. Additionally, in some embodiments, the electrode material can serve dual functions, i.e., as both as electrode and current collector, and, thus precluding the need for separate current collectors.

DETAILED DESCRIPTION OF SPECIFIC EMBODIMENTS

Figure 1:
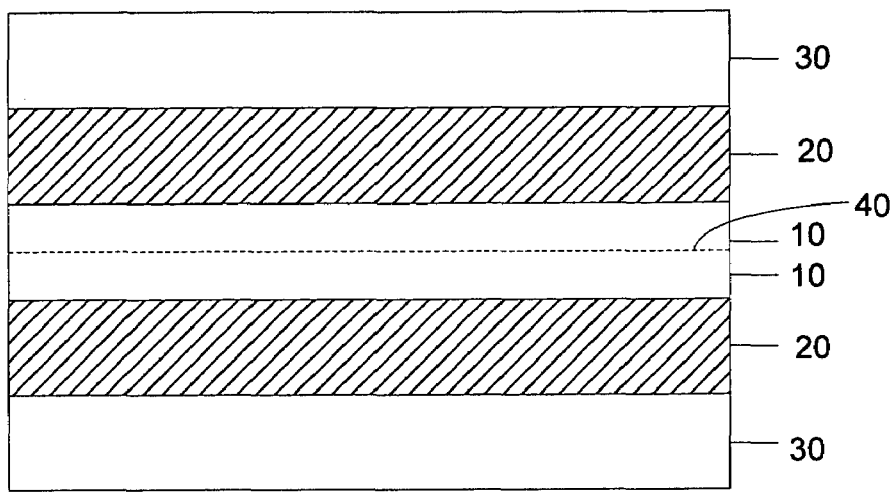
FIG. 1 shows the basic construction design of an electrochemical double-layer capacitor.

The present invention discloses a supercapacitor, also known as an electrical double-layer capacitor, employing a polarizable electrode material prepared from carbon nanotubes and polymer, wherein the polymer is capable of being carbonized and activated, and method for making the same.

In this application, the following definitions shall apply.

"Polymer" shall also include both polymers and copolymers. Copolymers shall is include all polymers having more than one monomer type, and, as such, include terpolymers, tetrapolymers, and other polymers with multiple monomer types.

"Stabilization" is a heat-treating procedure to impart stability to the polymer. Stabilization is typically done in an oxidizing environment, such as air, ammonia or steam. Stabilization is an optional step that is usually done before carbonization and at a lower temperature than carbonization.

"Carbonization" means to convert the polymer primarily to carbon. Carbonization is typically done at high temperature in a non-oxidizing environment. In carbonization, non-carbon species present in the polymer are released.

"Pyrolysis" means a chemical change induced by heat. Pyrolysis is used synonymously with "carbonization" herein. Pyrolysis is generally done in a non-oxidative environment.

"Activation" means a treatment to increase the porosity and surface area of the carbonized or pyrolyzed material. Typically, activation is done at high temperature in the presence of an oxidizing environment or through the action of a chemical activating agent.

Carbon nanotubes are generally categorized as single-wall carbon nanotubes (SWNT) and multi-wall carbon nanotubes (MWNT). SWNT are fullerenes consisting essentially of $sp^2$-hybridized carbon typically arranged in hexagons and pentagons. These carbon cylindrical structures, known commonly as "buckytubes," have extraordinary properties, including both high electrical and thermal conductivity, as well as high strength and stiffness. Multi-wall carbon nanotubes are nested single-wall carbon cylinders and possess some properties similar to single-wall carbon nanotubes. However, since single-wall carbon nanotubes have fewer defects than multi-wall carbon nanotubes, single-wall carbon nanotubes are generally stronger and more conductive. Additionally, single-wall carbon nanotubes have considerably higher available surface area per gram of carbon than multi-wall carbon nanotubes. Dispersing single-wall carbon nanotubes, however, is much more difficult than dispersing multi-wall nanotubes because the single-wall carbon nanotubes can "rope" together in aligned bundles of a few to many hundreds of nanotubes and be held tightly together by van der Waals forces.

Single-wall carbon nanotubes can be made from any known means, such as by gas-phase synthesis from high temperature, high pressure carbon monoxide, catalytic vapor deposition using carbon-containing feedstocks and metal catalyst particles, laser ablation, arc method, or any other method for synthesizing single-wall carbon nanotubes.

The single-wall carbon nanotubes can be used as-synthesized or after purification. In one embodiment, single-wall carbon nanotubes are purified to remove non-nanotube carbon, such as amorphous carbon and metallic catalyst residues. Metals, such as Group VIB and/or VIIIB, are possible catalysts for the synthesis of single-wall carbon nanotubes. After catalysis, the metallic residues may be encapsulated in non-nanotube carbon, such as graphitic shells of carbon. The metallic impurities may also be oxidized through contact with air or by oxidation of the non-nanotube carbon during purification.

Purification can be done by any known means. Procedures for purification of single-wall carbon nanotubes are related in International Patent Publications "Process for Purifying Single-Wall Carbon Nanotubes and Compositions Thereof," WO 02/064,869, published Aug. 22, 2002, and "Gas Phase Process for Purifying Single-Wall Carbon Nanotubes and Compositions Thereof," WO 02/064,868 published, Aug. 22, 2002, and incorporated herein in their entirety by reference. In one embodiment, the nanotubes are purified by heating at 250° C. in air saturated with water vapor. The heating is done for a length of time so as to oxidize at least some of the non-nanotube carbon, and, may, to some extent, oxidize the metal impurities. The oxidation temperature can be in the range of 200° C. and about 400° C., preferably about 200° C. to about 300° C. The oxidation can be conducted in any gaseous oxidative environment, which can comprise oxidative gases, such as oxygen, air, carbon dioxide, and combinations thereof. The concentration of the oxidative gases can be adjusted and controlled by blending with nitrogen, an inert gas, such as argon, or combinations thereof. The duration of the oxidation process can range from a few minutes to days, depending on the oxidant, its concentration, and the oxidation temperature. After oxidatively heating the nanotubes, the nanotubes are treated with acid to remove metallic impurities. In one embodiment, the nanotubes are slurried in the acid, which can be a mineral acid, an organic acid, or combinations thereof. Examples of acids that could be used to treat and slurry the nanotubes include, but are not limited to, hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, and combinations thereof. The acid used can be a pure acid or diluted with a liquid medium, such as an aqueous and/or organic solvent. Generally, an aqueous solvent is preferred. Concentrated aqueous hydrochloric acid is preferred for removing metallic impurities. After acid treating, the acid and impurities are removed from the nanotubes by rinsing. The nanotubes can be rinsed with water, an organic solvent or a combination thereof.

The carbon nanotubes can be optionally derivatized with one or more functional groups. The carbon nanotubes can be derivatized on their ends or sides with functional groups, such as alkyl, acyl, aryl, aralkyl, halogen; substituted or unsubstituted thiol; unsubstituted or substituted amino; hydroxy, and OR' wherein R' is selected from the group consisting of alkyl, acyl, aryl aralkyl, unsubstituted or substituted amino; substituted or unsubstituted thiol, and halogen; and a linear or cyclic carbon chain optionally interrupted with one or more heteroatom, and optionally substituted with one or more =O, or =S, hydroxy, an aminoalkyl group, an amino acid, or a peptide. Typically, the number of carbon atoms in the alkyl, acyl, aryl, aralkyl groups is in the range of 1 to about 30, or in some embodiments, in the range of 1 and about 10.

The following definitions are used herein.

The term "alkyl" as employed herein includes both straight and branched chain radicals; for example methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, the various branched chain isomers thereof. The chain may be linear or cyclic, saturated or unsaturated, containing, for example, double and triple bonds. The alkyl chain may be interrupted or substituted with, for example, one or more halogen, oxygen, hydroxy, silyl, amino, or other acceptable substituents.

The term "acyl" as used herein refers to carbonyl groups of the formula —COR wherein R may be any suitable substituent such as, for example, alkyl, aryl, aralkyl, halogen; substituted or unsubstituted thiol; unsubstituted or substituted amino, unsubstituted or substituted oxygen, hydroxy, or hydrogen.

The term "aryl" as employed herein refers to monocyclic, bicyclic or tricyclic aromatic groups containing from 6 to 14 carbons in the ring portion, such as phenyl, naphthyl substituted phenyl, or substituted naphthyl, wherein the substituent on either the phenyl or naphthyl may be for example $C_{1-4}$ alkyl, halogen, $C_{1-4}$ alkoxy, hydroxy or nitro.

The term "aralkyl" as used herein refers to alkyl groups as discussed above having an aryl substituent, such as benzyl, p-nitrobenzyl, phenylethyl, diphenylmethyl and triphenylmethyl.

The term "aromatic or non-aromatic ring" as used herein are preferably 5–8 membered aromatic and non-aromatic rings uninterrupted or interrupted with one or more heteroatom, for example O, S, SO, $SO_2$, and N, or the ring may be unsubstituted or substituted with, for example, halogen, alkyl, acyl, hydroxy, aryl, and amino, said heteroatom and substituent may also be substituted with, for example, alkyl, acyl, aryl, or aralkyl.

The term "linear or cyclic" when used herein includes, for example, a linear chain which may optionally be interrupted by an aromatic or non-aromatic ring. Cyclic chain includes, for example, an aromatic or non-aromatic ring which may be connected to, for example, a carbon chain which either precedes or follows the ring.

The term "substituted amino" as used herein refers to an amino which may be substituted with one or more substituent, for example, alkyl, acyl, aryl, aralkyl, hydroxy, and hydrogen.

The term "substituted thiol" as used herein refers to a thiol which may be substituted with one or more substituent, for example, alkyl, acyl, aryl, aralkyl, hydroxy, and hydrogen.

Any polymer that can be transformed into activated carbon can be used as the polymer in the present invention. Examples of polymers that can be transformed into activated carbon include such polymers as polyacrylonitrile, phenolic resins, phenol formaldehyde resin, polyacenaphthalene, polyacrylether, polyvinylchloride, polyvinylidene chloride, poly(p-phenylene terephthalamide), poly-L-lactide, polyimides, polyurethanes, nylons, polyacrylonitrile copolymers, such as poly(acrylonitrile-methyl acrylate), poly(acrylonitrile-methyl methacrylate), poly(acrylonitrile-itaconic acid-methyl acrylate), poly(acrylonitrile-vinyl pyridine), poly(acrylonitrile-vinyl chloride) and poly(acrylonitrile-vinyl acetate), and combinations thereof.

In one embodiment, the electrode film material is prepared by combining polymer and carbon nanotubes to make a generally homogeneous polymer-nanotube suspension. A polymer-nanotube suspension comprising polymer and carbon nanotubes can be prepared by combining carbon nanotubes with polymer by various methods.

In yet another embodiment, the polymer-nanotube suspension can comprise other additives or components, such as other polymers to produce a polymer blend, inorganic fillers, and combinations thereof for use in the formation of activated carbon electrodes. One example of a polymer blend, for example, is a polyaniline/polyethylene oxide blend. One example of an inorganic filler blended with a carbonizable polymer is a nylon/montmorillonite blend.

The concentration of nanotubes dispersed in the polymer is selected based on the properties desired for the end use application. Generally, the nanotube-to-polymer weight ratio can be in the range of about 1:99 and about 99:1. Preferably, the nanotube-to-polymer weight ratio is in the range of about 20:80 and about 80:20.

In one embodiment, the polymer-nanotube suspension is made without solvent, such as, for example, by melt blending. Melt blending can be done in various ways. For example, the polymer can be melted and the dry nanotubes added to the molten polymer and blended, such as, for example, with a twin screw extruder, Banbury mixer or other high-shear heated mixer. Alternatively, the polymer and nanotubes can be dry blended, such by blending polymer powder or pellets with nanotube powder or other aggregate forms, and then heated and melt blended by any known means.

In another embodiment, the polymer-nanotube suspension comprising polymer and carbon nanotubes can also comprise a solvent in which the polymer is dispersible, wherein the solvent can be used to make the polymer-nanotube suspension. In this embodiment, the carbon nanotubes can be combined in any order. The solvent can be combined with the polymer prior to, at the same time as, or after combining the nanotubes with the polymer. In yet another embodiment, the polymer and the nanotubes can each be separately combined and mixed with solvent. In this embodiment, the solvent-mixed nanotubes are mixed with the solvent-mixed polymer to form a polymer-nanotube suspension.

In such embodiment where solvent is used to prepare the polymer-nanotube suspension or dispersion, any solvent that will solubilize or suspend the polymer can be used to prepare to prepare a polymer solution to facilitate blending with the nanotubes. For example, dimethylformamide (DMF) can be used to suspend or solubilize acrylonitrile-containing polymers and other polymers that can be converted to activated carbon. Other examples of organic solvents that can be used to suspend acrylonitrile-containing polymers and other carbonizable polymers include such solvents as dimethyl sulfoxide (DMSO), ethylene carbonate, dimethylacetamide (DMAC), dioxanone, chloroacetonitrile, dimethyl sulfone, propylene carbonate, malononitrile, succinonitrile, adiponitrile, γ-butyrolactone, acetic anhydride, ε-caprolactam, bis (2-cyanoethyl)ether, bis(4-cyanobutyl)sulfone, chloroacetonitrile/water, chloroacetonitrile, cyanoacetic acid, dimethyl phosphate, tetramethylene sulfoxide, glutaronitrile, succinonitrile, N-formylhexamethyleneimine, 2-hydroxyethyl methyl sulfone, N-methyl-β-cyanoethylformamide, methylene dithiocyanate, N-methyl-α,α,α,-trifluoroacetamide, 1-methyl-2-pyridone, 3,4-nitrophenol, nitromethane/water (94:6), N-nitrosopiperidine, 2-oxazolidone, 1,3,3,5-tetracyanopentane, 1,1,1-trichloro-3-nitro-2-propane, p-phenolsulfonic acid and combinations thereof.

Examples of inorganic compounds that can be used in aqueous solutions as solvents to suspend acrylonitrile-containing polymers and/or other carbonizable polymers include such compounds as aqueous solutions of zinc chloride ($ZnCl_2$), sodium thiocyanate, nitric acid, lithium bromide, sulfuric acid, quaternary ammonium salts and combinations thereof. Molten quaternary ammonium salts are also examples of inorganic compounds that can be used to make suspensions of an acrylonitrile-containing polymer or other carbonizable polymer.

In such embodiment where a polymer-nanotube suspension is formed using a solvent, the suspension can be made by any suitable mixing means in order to form a generally homogeneous solution or suspension of the polymer. For example, a polymer suspension, such as, polyacrylonitrile or poly(acrylonitrile-methyl acrylate) (Mol. Wt.≈100,000 g/mol) in DMF, can be made by stirring overnight at room temperature with a magnetic stirrer. Heat can also be used to facilitate solution or suspension of the polymer.

The conditions and time required to make a generally homogeneous polymer suspension or solution will vary depending on various parameters, such as, but not limited to, the target polymer concentration, the structure, composition and molecular weight of the polymer, form of the polymer, such as a powder or granule, the particular solvent selected, temperature of components, solubility of the polymer in the solvent, amount of solvent and stirring means.

Any convenient means of dispersing the nanotubes may be used. Examples of suitable mixing means to make a generally homogeneous dispersion of nanotubes in the polymer solution include, but are not limited to mechanical stirring, such as with a magnetic stirrer, ultrasonic mixing, homogenization, and extrusion with active (e.g. twin screw) or static mixing means (e.g. static mixers in an extruder), other high-shear mixers, and combinations thereof. Combinations of dispersing techniques can be done simultaneously or in succession. In the case of extrusion, such as with a twin screw extruder, an extruder having a vent or vacuum to remove or exhaust solvent is preferred.

In an embodiment in which solvent is used to prepare the polymer-nanotube suspension, the amount of nanotubes, polymer and solvent depends on the nanotube-to-polymer ratio desired for a particular application and the viscosity needed for processing the mixture into a form. The amount of solvent in the polymer-nanotube suspension can be adjusted for subsequent processing. For example, solvent can be added or removed to make the polymer-nanotube suspension of the desired viscosity to facilitate film or fiber preparation. Solvent removal can be achieved by any known means, such as with the application of heat, application of a vacuum, ambient solvent evaporation, or a combination thereof. The time and temperature needed to adjust the concentration of the polymer-nanotube suspension are dependent on various parameters, including, but not limited to the particular solvent used, the amount of solvent to be removed, and the nature of the polymer.

After preparation of the polymer-nanotube suspension, the suspension is made into a composite shaped in a form tailored for the target end use application. Typical composite forms include, but are not limited to, film, fiber, non-woven mat, felt, and cloth. In an embodiment wherein a film is the desired form, a film of the polymer-nanotube suspension can be made by any known means. For example, the polymer-nanotube suspension of suitable viscosity can be coated or flowed onto any suitable surface, such as a metal or glass plate. Any other known means of film preparation can be used, such as, for example, extrusion, casting or coating. In the embodiment wherein the polymer-nanotube suspension is prepared without a solvent, the polymer-nanotube suspension can be melted and extruded as a film, with or without a casting roll. Optionally, the film or sheet can be oriented, either in the machine direction, the transverse direction or both.

In another embodiment, a non-woven fabric, a mat or felt may be the desired form of the composite. A non-woven fabric, mat or felt can be made from the polymer-nanotube suspension using such techniques as melt blowing and spun bonding methods or any other means of making nonwoven matted fabrics. Because these spinning techniques produce very small fibers, they can impart high surface area and porosity to the polymer-nanotube composite, which are desirable attributes for carbon-based electrodes.

In another embodiment, non-matted fibers may be the desired form, which can be used to make other forms, such as, but not limited to, woven cloth, braids, knits, and other arrangements of fibers desired for the particular end use application. A fiber can be made from the polymer-nanotube suspension by any known means of making fibers. Examples of techniques for making fibers include, but are not limited to, electrospinning, gel spinning, wet spinning, dry spinning and dry-jet wet spinning. Similar to the techniques for making nonwoven fabrics, mats and felts, these fiber spinning techniques can also impart high surface area and porosity to the resulting polymer-nanotube composite, attributes which are highly desirable for carbon-based electrode material.

After the desired form is made from the polymer-nanotube suspension, the remaining solvent, if any, is removed from the polymer-nanotube form. Any known means for removing the solvent from the polymer-nanotube form may be used. Examples of means for removing solvent, include, but are not limited to, vacuum drying, ambient evaporation, heating, coagulating the polymer-nanotube suspension in a non-solvent, or combinations thereof.

After removing the solvent, if any, from the polymer-nanotube mixture, the form, such as a film, can, optionally, be cut into pieces of the shape suitable for the desired end use application.

Hereinafter, the polymer-nanotube mixture in a solid form, made either with no solvent or wherein most of the solvent is removed, will also be referred to as polymer-nanotube "composite." Also, for the sake of clarity and conciseness, the "film" form of the nanotube-polymer composite will be used as an exemplary embodiment, with the understanding that this form also encompasses other embodiment forms, such as fibers, nonwoven fabrics, mats, felts, cloths, braids, knits, etc.

After removal of the solvent, if any, the nanotube-polymer composite in the desired form and shape can be thermally treated in several steps. The thermal processing steps comprise optional stabilization, carbonization or pyrolysis, and activation. The thermal processing steps affect the properties of the electrode material. Such properties include, but are not limited to, surface area, electrical conductivity, surface morphology, surface functionality, pore volume fraction, pore size and pore size distribution of the resulting carbonaceous material.

During the optional stabilization step, a portion of the polymer is transformed into a more thermally stable cyclic structure and, in the process, evolves volatile reaction byproducts, such as $H_2O$, $CO_2$ and HCN, with the type of byproducts being dependent on the particular pendant groups of the polymer. Stabilization is typically done in an oxidative environment at a temperature in the range of about 200° C. and about 300° C. Examples of oxidative environments include, but are not limited to, air, steam, ammonia, oxygen diluted in nitrogen or an inert gas, and combinations thereof. Air is a preferred oxidative environment during stabilization. A constant load can be applied to certain forms, such as fibers.

After optional stabilization, the polymer-nanotube composite is carbonized or pyrolyzed by heat treating in a non-oxidizing or inert atmosphere. During carbonization or pyrolysis, the remaining non-carbon elements of the polymer are removed as volatile byproducts and the remaining material is essentially all carbonaceous material. Any non-oxidizing or inert environment conducive for carbonizing the polymer may be used. Suitable environments that can be used are a vacuum (preferably less than 20 mm Hg), or alternatively, nitrogen, an inert gas, such as argon, or combinations thereof.

Pyrolysis can be done in one or more stages. The pyrolysis conditions, including the heating environment and temperature profile (i.e., time, temperature, heating rate, etc.) used to carbonize the polymer, can depend on several variables, including, but not limited to, the polymer used, the stability of other components in the polymer, such as the carbon nanotubes and any optional additives, the form and shape of the material, and the desired properties of the resulting carbonaceous material. Generally, temperatures greater than 500° C. are needed to partially carbonize the polymer, with higher temperatures resulting in more complete carbonization and elimination of non-carbon species. Temperatures on the order of 1600° C. can result in full carbonization. Temperatures on the order of 2700° C. typically result in graphitic carbon. An example of a typical three-stage pyrolysis temperature profile used for polyacrylonitrile-type fibers includes a first stage heating in the range of about 300° C. and about 600° C., a second stage heating in the range of about 600° C. and 1300° C., and a third stage heating in the range of about 1300° C. and 2500° C. In the present invention, the polymer in the polymer-nanotube composite films can be carbonized by heating at temperatures greater than 500° C. for a time, on the order of about 0.5 minute to about 30 minutes.

Carbonized nanotube-polymer composite materials can be used as electrodes in a supercapacitor assembly, however, higher performance is achieved with activation of the carbonized nanotube-polymer composite. Activation increases the porosity and surface area of the carbonized polymer-nanotube composite. Besides increasing the pore volume fraction, pore volume and pore size distribution, activation can also affect the surface morphology and functionality. Activation processes can be generally divided into two categories: physical and chemical activation.

Physical activation involves gasification of the carbonized material in the presence of an oxidative gaseous atmosphere, such as air, steam, carbon dioxide, or other oxidative environments used to prepare activated charcoal. Activation temperatures are typically at least about 500° C., and, preferably in the range of about 600° C. and about 1000° C. The duration of the activation depends on the shape, form and composition of the material, as well as the temperature and gaseous environment during activation.

Chemical activation involves the thermal decomposition of precursor materials impregnated with chemical agents, such as potassium hydroxide (KOH), zinc chloride ($ZnCl_2$), sodium carbonate ($Na_2CO_3$) and phosphoric acid. Not meaning to be held by theory, in chemical activation, the chemical agents can act as dehydrating agents to promote the formation of crosslinked rigid matrices that are less susceptible to volatilization and contraction during carbonization. Lower temperatures can be used in chemical activation because carbon burn-off is not required, as it is in physical activation.

In the chemical activation of a polymer-nanotube composite, a chemical agent, such as potassium hydroxide, zinc chloride, sodium carbonate or phosphoric acid, is added to the polymer-nanotube mixture. The addition and mixing of the chemical agent into the polymer-nanotube mixture can be done at any time prior to forming the polymer-nanotube mixture into a composite form, such as a fiber, film, etc. The subsequent steps of, optional stabilization, pyrolysis and activation, can typically be done at milder, i.e. lower temperature, conditions than when chemical agents are not used.

Activation of the polymer-nanotube composite results in an activated carbonaceous polymer-nanotube material that can be used as an electrode material in supercapacitors and other device employing electrode materials.

To form a supercapacitor, electrode material is contacted with a metallic current collector. Current collector material can be any conducting material, but is typically a metal, such as copper, aluminum, nickel, stainless steel, etc. To further form the supercapacitor, electrolyte is contacted with and interposed between two electrodes, wherein each electrode is in contact with a current collector.

The arrangement of the basic elements of one embodiment of the supercapacitor is shown in FIG. 1. An electrolyte (10) is in contact with and able to permeate into two opposing porous electrodes (20), which are, in turn, in contact with and between two metallic current collectors (30). In the case of a fluid or compressible electrolyte, a separator or spacer (40), permeable by the electrolyte, can be interposed between the electrodes to prevent shorting.

The electrolyte is a material that provides a charge reservoir for the supercapacitor. The electrolyte can be a solid or a fluid. If the electrolyte is a fluid, the electrolyte enters the pores of the electrode material and provides the ionic charge carriers for charge storage. A fluid or compressible electrolyte requires that a non-conducting separator or a spacer be interposed between the electrodes to prevent contact and shorting. The separator is permeable to allow ion flow between the electrodes. Examples of non-conducting permeable separator material are porous hydrophilic polyethylene, fiberglass mats and porous glass paper.

The electrolytes, which can be fluid or solid, are chosen so as to minimize internal resistance of the supercapacitor. The size of the solvated electrolyte ions is a factor in that it affects the accessibility to the pores of the carbon nanotube-activated carbon composite electrodes, which, in turn, influences the extent of the electrical double layer formation. Fluid electrolytes in supercapacitors are typically aqueous or organic. In aqueous systems, sulfuric acid ($H_2SO_4$), potassium hydroxide (KOH) and sodium hydroxide (NaOH) are preferred. However, since strong acids are much more corrosive than strong hydroxide solutions, the latter are more preferred. Aqueous electrolytes, e.g. KOH and $H_2SO_4$, have higher conductivity compared to organic electrolytes and are therefore, suitable for high power density applications. However, due to water's low electrochemical decomposition potential of 1.24V, supercapacitors based on aqueous electrolytes generally cannot withstand voltages over about one Volt, which limits the energy density of this type of supercapacitor.

Organic electrolytes, in contrast, have lower conductivity, but can withstand higher operating voltages due to higher electrochemical decomposition limits than those of aqueous electrolytes. Tetraalkylammonium salts, also known as quaternary ammonium salts, are preferred electrolytes due to their good solubility in nonaqueous solvents and fairly good conductivity. Non-aqueous, dipolar aprotic solvents with high dielectric constants, such as organic carbonates are preferred. Examples of suitable organic carbonates are ethylene carbonate (EC), propylene carbonate (PC), propanediol-1,2-carbonate (PDC), and dichloroethylene carbonate (DEC).

Polymer gel electrolytes have high electrical potential resistance and are less susceptible to leakage problems that can occur with liquid electrolytes. Polymer gel electrolytes are polymer-electrolyte systems, in which the polymer forms a matrix for the electrolyte species. A plasticizer can also be a component of the polymer-electrolyte system. Examples of suitable polymer gel electrolytes include, but are not limited to, such systems as polyurethane-$LiCF_3SO_3$, polyurethane-lithium perchlorate, polyvinylacohol-KOH—$H_2O$, poly(acrylonitrile)-lithium salts, poly(acrylonitrile)-quaternary ammonium salts, and poly(ethylene oxide)-grafted poly(methyl)-methacrylate-quaternary ammonium salts. Additionally, other compounds, such as ethylene carbonate and propylene carbonate, can also be incorporated into the polymer matrix.

Polymer gel electrolytes used in supercapacitors having electrodes made from nanotube-polymer composite material can be used for on-chip all-solid-state thin film supercapacitors for such applications as satellites and microelectronic mechanical systems (MEMS). Such supercapacitors also provide a non-Faradaic alternative to on-chip supercapacitors with electrodes made of thin sputter-coated films of metal oxides, such as $RuO_2$ and $CO_3O_4$.

The basic arrangement of components in most supercapacitors consists of two active electrodes, interposed with an electrolyte, separated by an insulating porous separator and sandwiched between two metallic current collectors. Multiple layers of current collector (CC), electrode material (EM) and separator (SP) can be used in different designs to provide the desired power density and energy density for a particular application. Examples of multiple-layer constructions based on this basic arrangement include, but are not limited to, the bi-polar stacked design (50) shown in FIG. 2A and the spiral-wound design (60), diagrammed in FIG. 2B.

Figure 2A:
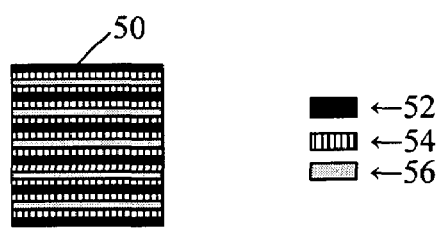
FIG. 2A shows a bi-polar stack design for supercapacitor construction.
Figure 2B:
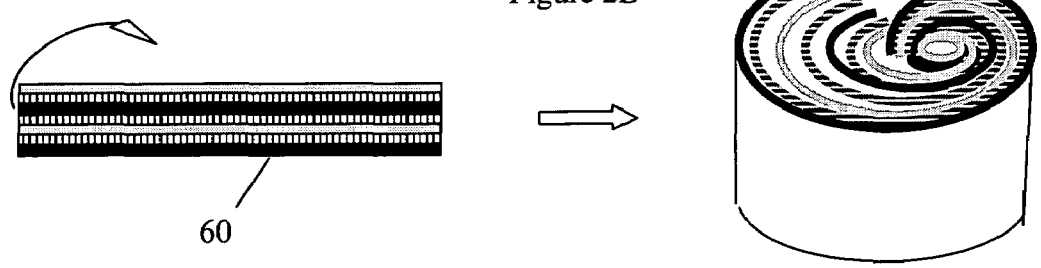
FIG. 2B shows a spiral-wound design for supercapacitor construction.

The stacked capacitor (50) of FIG. 2A and the spiral-wound capacitor (60) of FIG. 2B each comprise a plurality of metallic current collectors (52), porous electrodes (54), and separators (56). In a bi-polar stack design (60), the current collector, electrode and separator are stacked in a repeating pattern, such as CC-EM-SP-EM-CC-EM-SP-EM-CC. A similar stack, such as EM-CC-EM-SP-EM-CC-EM-SP, can be rolled up into a cylindrical structure to produce a spiral-wound design (60).

The capacitance performance of the activated carbonaceous polymer-nanotube composite supercapacitor can be evaluated by such methods as galvanostatic charge-discharge, cyclic voltammetry, and AC impedance techniques.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This example demonstrates a method for preparing a composite film comprising single-wall carbon nanotubes and 90/10 poly(acrylonitrile/methyl acrylate) copolymer "P(AN/MA)." The composite is designated SWNT-P(AN/MA).

75 mg powdered 90/10 poly(acrylonitrile/methyl acrylate) copolymer, Mol. Wt.≈100,000 g/mol, (obtained from Aldrich) was added to 50 mls dimethylformamide (DMF) and stirred with a magnetic stirrer at room temperature for 24 hours to form a homogeneous P(AN/MA)/DMF solution. Single-wall carbon nanotubes (Lot No. HIPCO86) were obtained from Rice University, where they were made in a high temperature, high pressure, all-gas phase process through the disproportionation of carbon monoxide (CO) to SWNT and $CO_2$ using iron as the transition metal catalyst. A suspension of SWNT was prepared by adding 50 mg unpurified, as-produced SWNT to the P(AN/MA)/DMF solution and homogenizing with a Bio-Homogenizer (Model 133/1281-0, Biospec Products Inc., Bartlesville, Okla.) for 2 to 3 minutes. The homogenized suspension was stirred by a motor-driven glass rod in a beaker, and simultaneously sonicated with a bath sonicator for one hour at room temperature. After sonication and stirring, the SWNT suspension in P(AN/MA)/DMF solution was heated to about 100° C. to evaporate a portion of the DMF solvent and to form a more viscous SWNT suspension. The SWNT suspension was then cast onto a glass plate to form a SWNT-P(AN/MA) composite film. The casting was done by drawing the suspension into a syringe and discharging the suspension onto a glass plate. Typically, the resulting film thickness was about 10 μm, however the film thickness could be varied depending on the amount of suspension. A filter, such as a stainless steel filter, can be used to remove large aggregates. Residual DMF solvent was removed under vacuum overnight at elevated temperature in the range of about 80° C. to 100° C. The SWNT-P(AN/MA) composite film was cut into round 11.82-mm diameter pieces for subsequent heat treatment.

EXAMPLE 2

This example demonstrates the heat treatment of SWNT-P(AN/MA) composite film samples. SWNT-P(AN/MA) composite film samples in the shape of 11.82-mm diameter round pieces were subjected to various heat treatments in the presence of different gaseous environments. Each heat treatment was conducted by placing the SWNT-P(AN/MA) composite film sample in a tubular furnace heated to a particular temperature and holding the sample at that temperature for a period of time in the presence of a particular gaseous environment. One sample, designated as a control film, was not subjected to any post-treatment in order to determine the effect of the treatments. The samples and heat treatments are listed in Table I.

TABLE I

| Sample Designation | Heat-treatment Temperature (° C.) | Heat treatment time (minutes) | Heat treatment environment |
|---|---|---|---|
| SWNT-P(AN/MA) Control film | No heat treatment | None | Not applicable |
| Air-250 | 250 | 10 | air |
| Ar-400 | 400 | 3 | argon |
| Ar-700 | 700 | 3 | argon |
| Ar-2 | 700 | 30 | argon |
| Ar-1000 | 1000 | 3 | argon |

EXAMPLE 3

Figure 3:
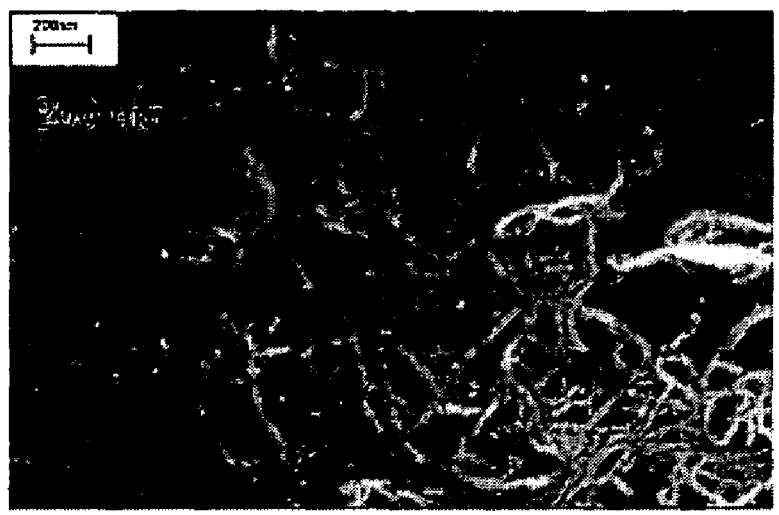
FIG. 3 shows a scanning electron micrograph of as-received single-wall carbon nanotubes.

This example shows the microstructure of the heat-treated SWNT-P(AN/MA) film sample. Scanning electron micrographs (SEM) were taken of as-received single-wall carbon nanotubes (Rice University Lot HIPCO86) and the heat treated SWNT-P(AN/MA) films prepared in Example 2. FIG. 3 shows a SEM photomicrograph of the as-received single-wall carbon nanotubes. In this micrograph, the single-wall carbon nanotubes appear as a mat of tangled bundles of substantially-aligned SWNT called ropes. The diameters of the SWNT ropes in this example ranged from about 28 nm to about 42 nm.

Figure 4:
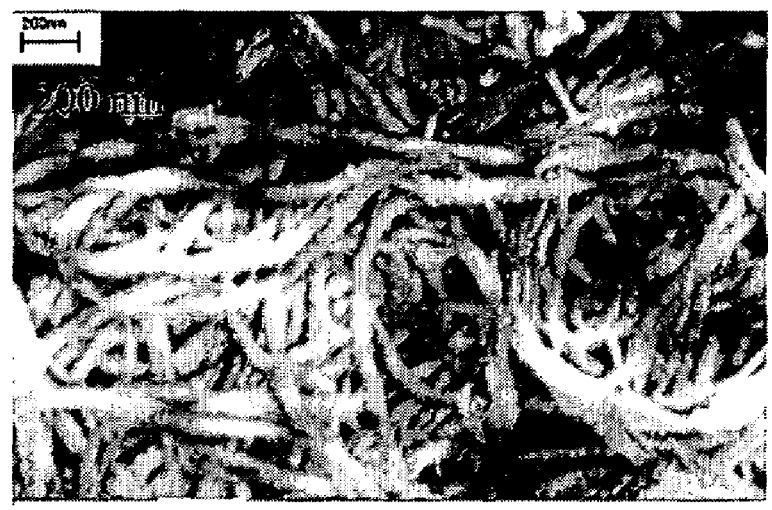
FIG. 4 shows a scanning electron micrograph of P(AN/MA)-coated single-wall carbon nanotubes after pyrolysis at 700° C. in argon.

A SEM micrograph of the SWNT-P(AN/MA) film sample heated at 700° C. for 3 minutes in argon (designated Ar-700), given in FIG. 4, shows a mat of tangled SWNT rope-like structures, similar to the as-received SWNT, but, in this case, encapsulated in P(AN/MA). The diameters of the SWNT-P(AN/MA) composite ropes in this example ranged from about 49 nm to about 65 nm. SEMs of the other heat-treated SWNT-P(AN/MA) composite ropes were similar to that of FIG. 4 and showed polymer-coated SWNT of similar appearance. Cracks and pores were also observed in some of the electron micrographs of the heat-treated polymer-nanotube composites.

EXAMPLE 4

In this example, the capacitance behavior of the SWNT-P(AN/MA) film samples prepared by heat treatments given in Example 2 was quantified using galvanostatic charge-discharge cycling methodology.

Figure 5:
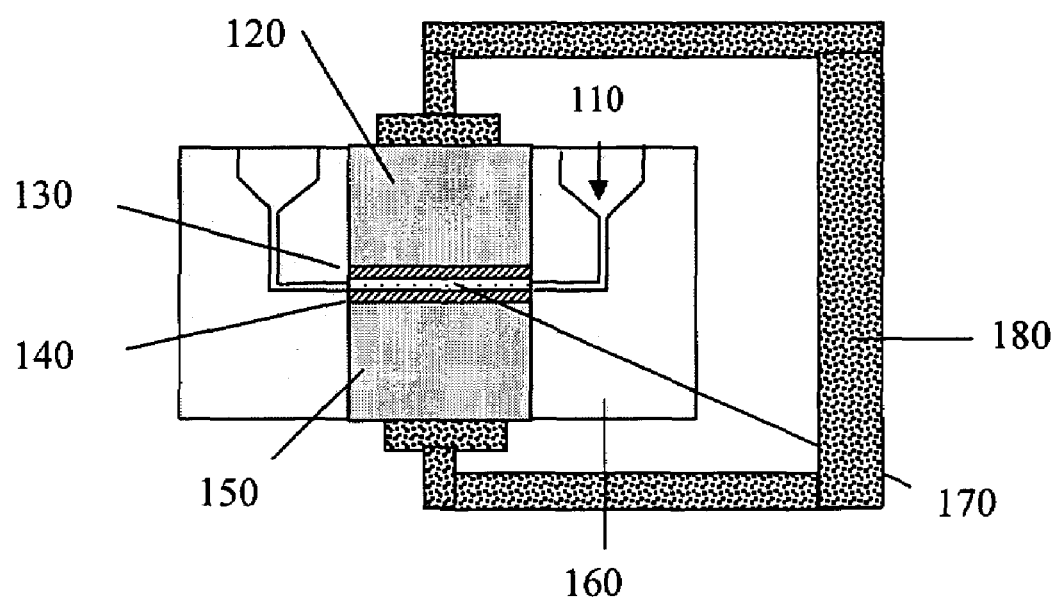
FIG. 5 shows a diagram of the test cell apparatus used in Example 4.

A diagram of the test cell is shown in FIG. 5. The test cell comprises an electrolyte (110) which is contained in an electrolyte holder (160), a first current collector (120) in contact with a first film electrode (130), a second film electrode (140), which is in contact with a second current collector (150), and wherein the first film electrode (130) is separated from the second film electrode (140) by a porous separator (170), which is porous to the ions of the electrolyte (110). A bar clamp (180) serves to hold the current collectors, film electrodes and separator tightly together.

A two-electrode test cell was constructed using two 11.82-mm diameter stainless steel rods for current collectors, aqueous 6N KOH solution as the electrolyte, and hydrophilic polyethylene film as the porous separator between the two SWNT-P(AN/MA) composite film electrodes. A clamp was used to hold the test cell together and ensure good contact between the components.

In addition to the SWNT-P(AN/MA) composite film electrodes, a "bucky paper," (i.e. a thin mat of purified single-wall carbon nanotubes obtained from Carbon Nanotechnologies, Inc., Houston, Tex., designated LR# CNI 0003-69-2), was also tested as a film electrode.

Figure 6A:
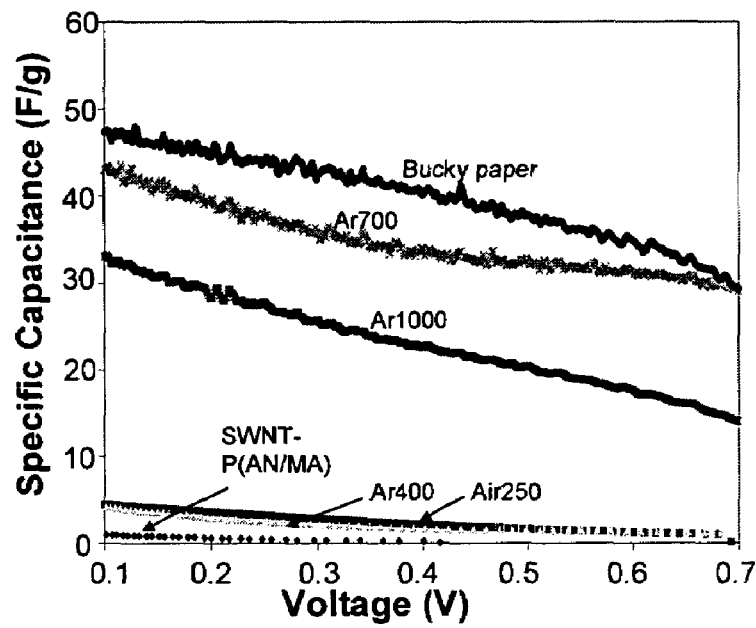
FIG. 6A shows plots of specific capacitance versus voltage for various electrode samples at a discharging rate of 0.001 A.
Figure 6B:
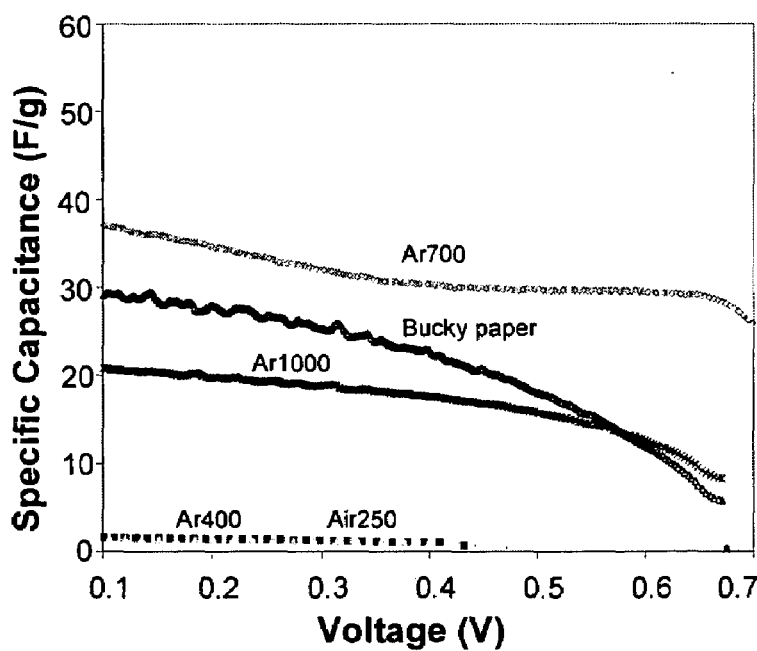
FIG. 6B shows plots of specific capacitance versus voltage for various electrode samples at a discharging rate of 0.005 A

The charge-discharge cycling was done between 0 and 0.8 volts using charge-discharge currents of 0.001, 0.005, and 0.01 amps (A). The specific capacitances of the film electrodes were calculated in terms of Farads/gram (F/g) for 0.001 A, 0.005 A and 0.01 A discharging currents. Plots of specific capacitance versus voltage are shown for various film electrodes at discharging currents of 0.001 A in FIG. 6A and 0.005 A in FIG. 6B. The specific capacitance of the film electrodes varied with discharge current. Higher specific capacitance was observed for all the film electrodes at the lower discharging rate (0.001 A) than at the high discharging rate (0.005 A). Although not meant to be held by theory, at high charging-discharging current, the small size pores appear to be not as readily available for the formation of the electrical double layer. Thus, the total effective available area of the electrical double layer is less at high charging-discharging rates than the area that can be obtained at lower charging-discharging rates.

The specific capacitance performance of the Ar-700 SWNT-P(AN/MA) electrode film and a bucky paper of single-wall carbon nanotubes (LR# CNI 0003-69-2 obtained from Carbon Nanotechnologies, Inc., Houston, Tex.), was measured at various discharging rates. The specific capacitances at 0.4V are quantified in Table II.

TABLE II

| | Specific Capacitance at 0.4 V (F/g) Rate of discharge | | |
|---|---|---|---|
| Electrode film | 0.001 A | 0.005 A | 0.01 A |
| Bucky Paper | 40 | 33 | 26 |
| Ar-700 | 34 | 30 | 28 |

EXAMPLE 5

This example demonstrates activation of SWNT-P(AN/MA) composite films in $CO_2$. The SWNT-P(AN/MA) composite film samples heated at 700° C. in argon for 3 and 30 minutes, (as prepared in Example 2 and designated Ar-700 and Ar-2, respectively) were subjected to $CO_2$ at different activation temperatures for various lengths of time. The activation conditions for the $CO_2$-activated SWNT-P(AN/MA) electrode films prepared in this example are summarized in Table III.

TABLE III

| $CO_2$ activated film designation | Starting film for $CO_2$ activation | $CO_2$ activation temperature (° C.) | $CO_2$ activation time (minutes) |
|---|---|---|---|
| $CO_2$-700-2 min | Ar-700 | 700 | 2 |
| $CO_2$-700-8 min | Ar-700 | 700 | 8 |
| $CO_2$-700-800 | $CO_2$-700-2 min | 800 | 2 |
| $CO_2$-700-900 | $CO_2$-700-2 min | 900 | 2 |
| $CO_2$-3 | Ar-2 | 700 | 20 |
| $CO_2$-4 | Ar-2 | 700 | 30 |

Figure 7:
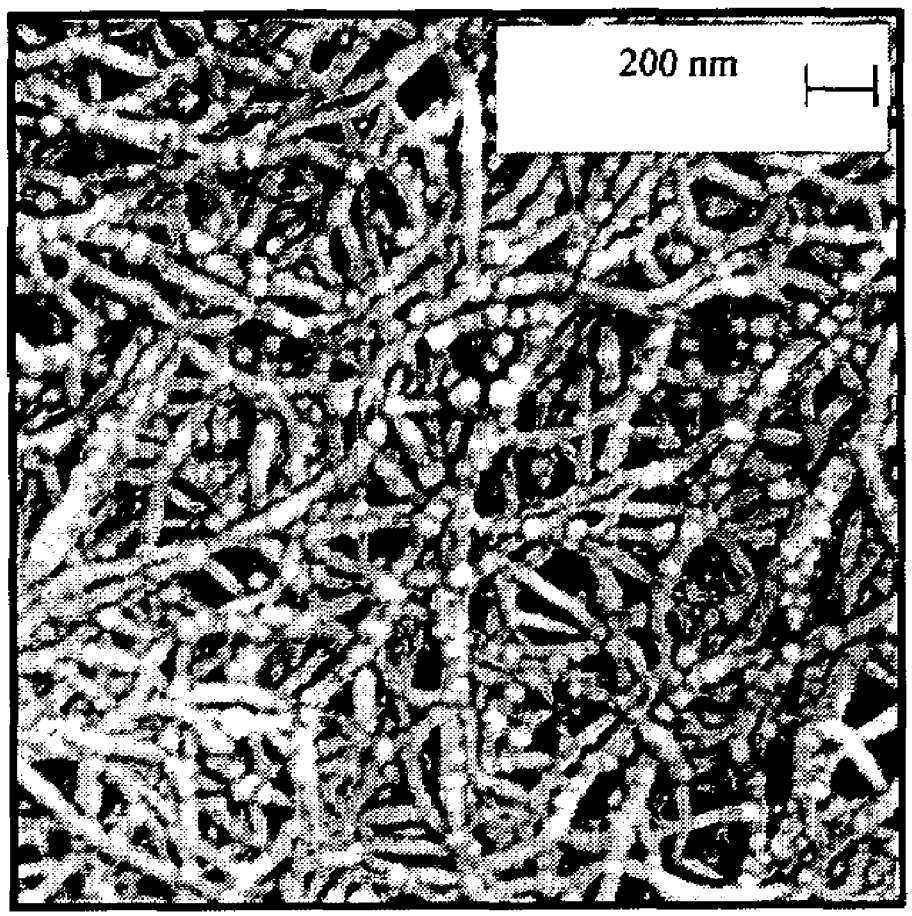
FIG. 7 shows a scanning electron micrograph of P(AN/MA)-coated single-wall carbon nanotubes after pyrolysis at 700° C. in argon and activation at 700° C. in $CO_2$.

A SEM micrograph of the SWNT-P(AN/MA) film sample heated at 700° C. for 30 minutes in argon and activated in $CO_2$ at 700° C. for 30 minutes (designated $CO_2$-4) is shown in FIG. 7. The $CO_2$-activated sample appears as a mat of tangled SWNT rope-like structures, similar to the heat-treated SWNT-P(AN/MA) film sample of FIG. 4, but, with more porosity.

EXAMPLE 6

This example demonstrates the quantification of the capacitance behavior of the SWNT-P(AN/MA) film samples prepared by activation conditions given in Example 5 and as measured by the galvanostatic charge-discharge cycling methodology described in Example 4.

Figure 8A:
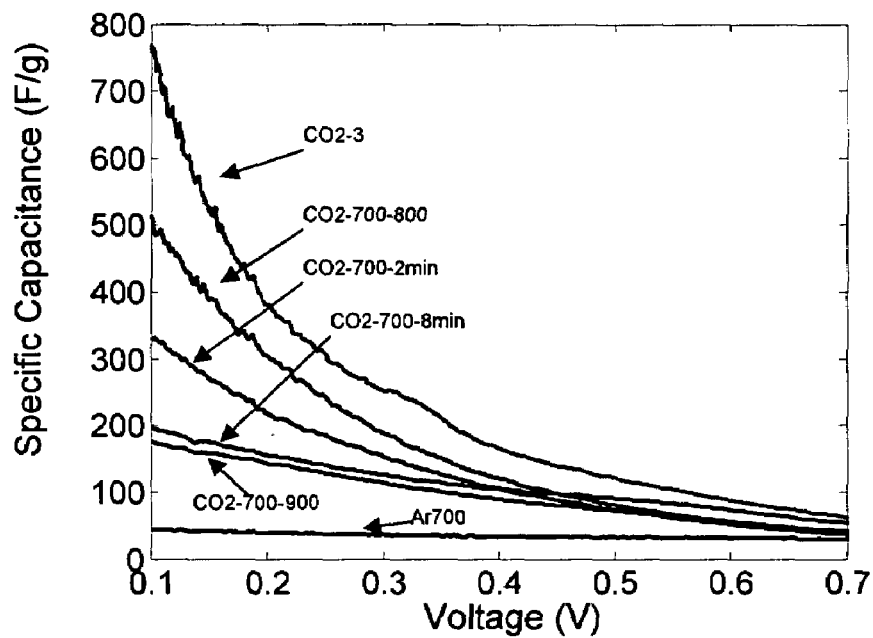
FIG. 8A shows plots of specific capacitance versus voltage for various electrode samples at a discharging rate of 0.001 A.
Figure 8B:
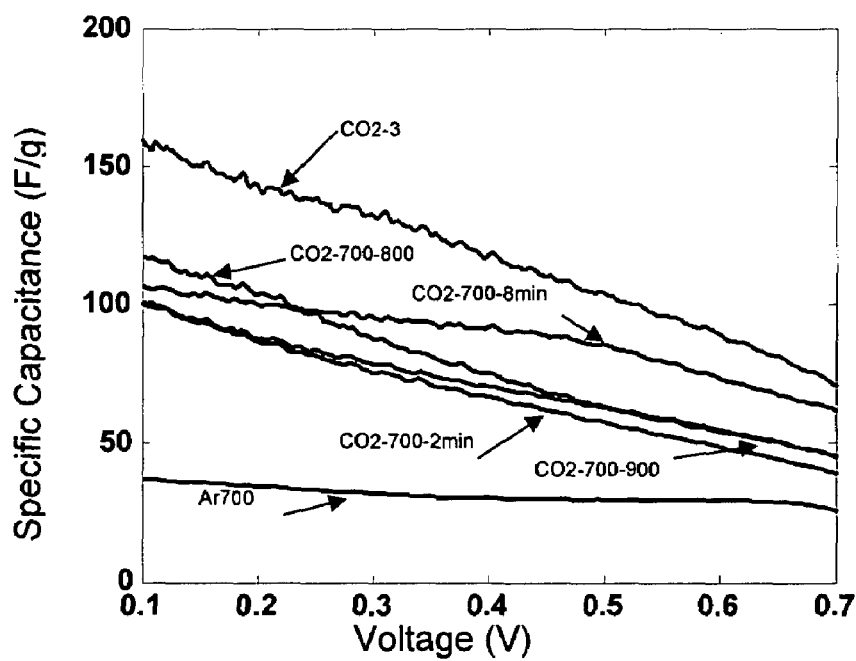
FIG. 8B shows plots of specific capacitance versus voltage for various electrode samples at a discharging rate of 0.005 A.

Plots of specific capacitance versus voltage are given in FIG. 8A for 0.001 A discharge current and FIG. 8B for 0.005 A discharge current. The specific capacitance, power density and energy density of the $CO_2$-activated Ar-700 SWNT-P (AN/MA) electrode films are compared to the unactivated Ar-700 SWNT-PAN electrode film in Tables IV and V.

TABLE IV

| | Specific Capacitance at 0.4 V (F/g) Rate of discharge | | |
|---|---|---|---|
| Electrode film | 0.001 A | 0.005 A | 0.01 A |
| Bucky Paper | 40 | 33 | 26 |
| Ar-700 | 34 | 30 | 28 |
| $CO_2$-700-2 min | 106 | 67 | 60 |
| $CO_2$-700-8 min | 105 | 92 | 88 |
| $CO_2$-700-800 | 122 | 75 | 69 |
| $CO_2$-700-900 | 90 | 71 | 67 |
| $CO_2$-3 | 167 | 117 | 107 |
| $CO_2$-4 | 118 | 78 | 69 |

TABLE V

| | Power density (W/kg) Rate of discharge | | | Energy density (Wh/kg) Rate of discharge | | |
|---|---|---|---|---|---|---|
| Electrode Film | 0.001 A | 0.005 A | 0.01 A | 0.001 A | 0.005 A | 0.01 A |
| Ar-700 | 209 | 1048 | 2100 | 0.45 | 0.34 | 0.21 |
| $CO_2$-700-2 min | 238 | 1190 | 2391 | 0.85 | 0.69 | 0.58 |
| $CO_2$-700-8 min | 259 | 1299 | 2594 | 1.07 | 1.04 | 0.96 |
| $CO_2$-700-800 | 242 | 1213 | 2421 | 0.93 | 0.80 | 0.73 |
| $CO_2$-700-900 | 249 | 1250 | 2512 | 0.82 | 0.75 | 0.69 |

EXAMPLE 7

Ragone plots, which relate the power density to the energy density of an energy storage device, were plotted for various electrode samples to determine the available power limits and optimum working regions for the samples.

Based on the constant current discharge experiment, the power density (PD) evaluated based on a single electrode is calculated by $$PD = IV(t)/(m_A + m_B)$$

and the corresponding energy density (ED) is $$ED = \int_{t=0}^{T} IV(t)\,dt/(m_A + m_B).$$

Figure 9:
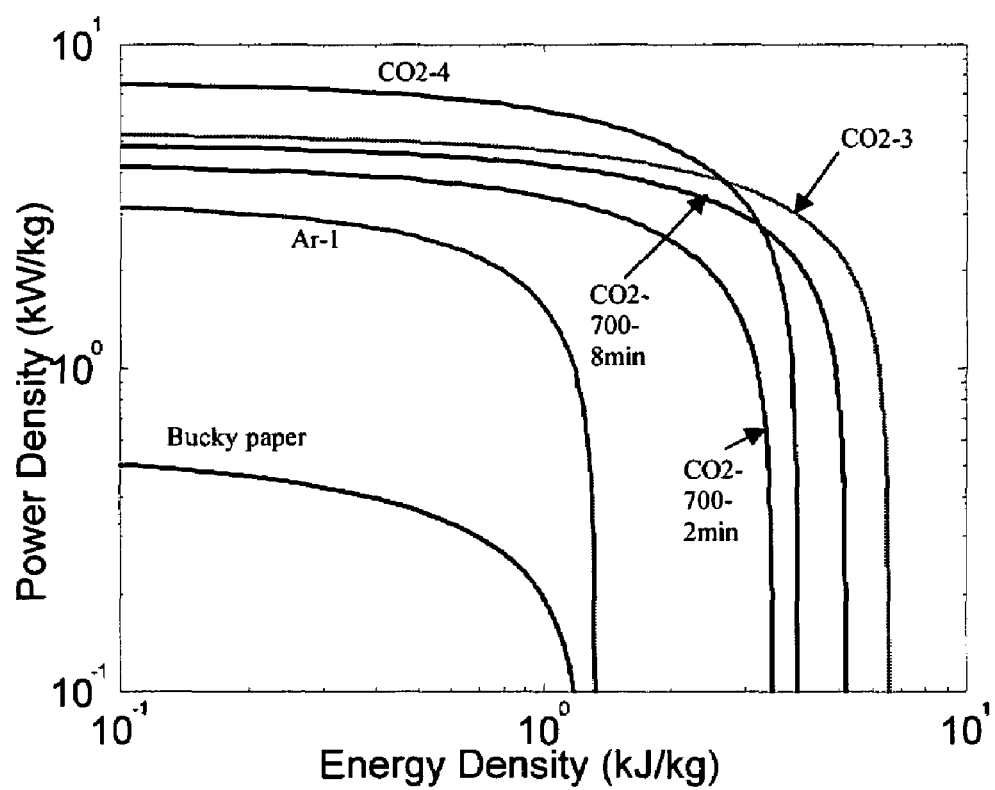
FIG. 9 shows Ragone plots of power density versus energy density for various electrode samples at a discharging rate of 0.01 A.

Ragone plots for electrode samples of as-received single-wall carbon nanotube bucky paper (LR# CNI 0003-69-2 obtained from Carbon Nanotechnologies, Inc., Houston, Tex.), Ar-700 (prepared by heat treating according to the procedures in Example 2), and $CO_2$-activated films $CO_2$-700-2 min, $CO_2$-700-8 min, $CO_2$-3, and $CO_2$-4 (activated according to the procedures in Example 5) are shown in FIG. 9 for a discharging rate of 0.01 A. The plots show that, at the same discharging current, the power density delivered by the electrodes prepared with polymer and nanotubes are about an order of magnitude higher than that of single-wall carbon nanotubes in the form of a bucky paper without the polymer component.

Although not being meant to be held by theory, all of the electrodes prepared with non-derivatized single-wall carbon nanotubes and polymer that was carbonized and activated appear to operate electrostatically, such that the supercapacitors formed are of the non-Faradaic type.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A supercapacitor comprising:
   (a) at least two electrodes comprising an activated carbonaceous polymer-nanotube material comprising single-wall carbon nanotubes and polymer, wherein the polymer is poly(acrylonitrile-methyl acrylate) copolymer or poly(acrylonitrile-itaconic acid-methyl acrylate) copolymer, and wherein the polymer-nanotube material was pyrolyzed and activated;
   (b) at least two current collectors, each in contact with an electrode, wherein the current collector comprises a conducting material; and
   (c) an electrolyte interposed between the electrodes.

2. The supercapacitor of claim 1 further comprising a non-conducting separator in between the at least two electrodes.

3. The supercapacitor of claim 2 wherein the separator is permeable by the electrolyte.

4. The supercapacitor of claim 2 wherein the separator comprises a material selected from the group consisting of hydrophilic polyethylene, fiberglass mat and porous glass paper.

5. The supercapacitor of claim 1 wherein the electrolyte comprises an aqueous solution of a compound selected from the group consisting of sulfuric acid, potassium hydroxide, and sodium hydroxide.

6. The supercapacitor of claim 1 wherein the electrolyte comprises a tetraalkylammonium salt.

7. The supercapacitor of claim 1 wherein the electrolyte comprises an organic carbonate selected from the group consisting of ethylene carbonate, propylene carbonate, propanediol-1,2-carbonate and dichlorethylene carbonate.

8. The supercapacitor of claim 1 wherein the electrolyte comprises a polymer gel electrolyte selected from the group consisting of polyurethane-$LiCF_3SO_3$, polyurethane-lithium perchlorate, polyvinylacohol-KOH—$H_2O$, poly(acrylonitrile)-lithium salts, poly(acrylonitrile)-quaternary ammonium salts, and poly(ethylene oxide)-grafted poly(methyl)-methacrylate-quaternary ammonium salts.

9. The supercapacitor of claim 1 wherein the conducting material comprises a material selected from the group consisting of copper, aluminum, nickel and stainless steel.

10. The supercapacitor of claim 1 wherein the single-wall carbon nanotubes are derivatized with a functional group.

11. The supercapacitor of claim 1 wherein the single-wall carbon nanotubes and the polymer are in a weight ratio in the range of about 99:1 and about 1:99.

12. The supercapacitor of claim 1 wherein the single-wall carbon nanotubes and the polymer are in a weight ratio in the range of about 80:20 and about 20:80.

13. The supercapacitor of claim 1 wherein the polymer-nanotube material was activated by heating in carbon dioxide.

14. The supercapacitor of claim 1 wherein the electrode is a form selected from the group consisting of a film, fiber, fabric, felt, mat and combinations thereof.

15. The supercapacitor of claim 1 wherein the electrode is a film.

16. The supercapacitor of claim 1 wherein the electrode is a fabric.

17. The supercapacitor of claim 16 wherein the fabric is nonwoven.

18. The supercapacitor of claim 1 wherein the carbonaceous polymer-nanotube material is a fiber.

19. The supercapacitor of claim 1 herein the activation is done in a gaseous atmosphere comprising carbon dioxide.

20. The supercapacitor of claim 1 wherein the electrolyte is organic or aqueous.

21. The supercapacitor of claim 1 wherein the electrolyte comprises a compound selected from the group consisting of sulfuric acid, potassium hydroxide, sodium hydroxide, and combinations thereof.

22. The supercapacitor of claim 1 wherein the electrolyte comprises a compound selected from the group consisting of quaternary ammonium salts, ethylene carbonate, propylene carbonate, propanediol-1,2-carbonate, dichloroethylene carbonate, and combinations thereof.

23. The supercapacitor of claim 1 wherein the electrolyte is a polymer gel electrolyte.

24. The supercapacitor of claim 1 wherein the supercapacitor is a bi-polar stacked capacitor.

25. The supercapacitor of claim 1 wherein the supercapacitor is a spiral-wound capacitor.

26. A supercapacitor comprising:
   (a) at least two electrodes comprising an activated carbonaceous polymer-nanotube material comprising single-wall carbon nanotubes and polymer, wherein the polymer-nanotube material was pyrolyzed and activated;
   (b) at least two current collectors, each in contact with an electrode, wherein the current collector comprises a conducting material; and
   (c) an electrolyte interposed between the electrodes;
   wherein the supercapacitor is a non-Faradaic supercapacitor.

27. The supercapacitor of claim 1 wherein the supercapacitor is an on-chip all-solid-state thin film supercapacitor.

28. The supercapacitor of claim 1 wherein the supercapacitor is a component of a microelectronic mechanical system (MEMS).

29. An electrode comprising an activated carbonaceous polymer-nanotube material comprising single-wall carbon nanotubes and polymer, wherein the polymer is poly(acrylonitrile-methyl acrylate) copolymer or poly(acrylonitrile-itaconic acid-methyl acrylate) copolymer, and wherein the polymer-nanotube material was pyrolyzed and activated.

30. The electrode of claim 29 wherein the single-wall carbon nanotubes are derivatized with a functional group.

31. The electrode of claim 29 wherein the single-wall carbon nanotubes and the polymer are in a weight ratio in the range of about 99:1 and about 1:99.

32. The electrode of claim 29 wherein the single-wall carbon nanotubes and the polymer are in a weight ratio in the range of about 80:20 and about 20.80.

33. The electrode of claim 29 wherein the polymer-nanotube material was activated by heating in carbon dioxide.

34. The electrode of claim 29 wherein the electrode is a form selected from the group consisting of a film, fiber, fabric, felt, mat and combinations thereof.

35. The electrode of claim 29 wherein the electrode is a fabric.

36. The electrode of claim 35 wherein the fabric is nonwoven.

37. The electrode of claim 29 wherein the carbonaceous polymer-nanotube material is a fiber.

38. The electrode of claim 29 wherein the activation is done in a gaseous atmosphere comprising carbon dioxide.

* * * * *

UNITED STATES PATENT AND TRADEMARK OFFICE
CERTIFICATE OF CORRECTION

PATENT NO.      : 7,061,749 B2                                          Page 1 of 1
APPLICATION NO. : 10/609725
DATED           : June 13, 2006
INVENTOR(S)     : Tao Liu and Satish Kumar It is certified that error appears in the above-identified patent and that said Letters Patent is hereby corrected as shown below:

Column 19, line 47, "herein" should instead be -- wherein --.

Signed and Sealed this

Sixteenth Day of October, 2007

JON W. DUDAS
*Director of the United States Patent and Trademark Office*